(12) United States Patent
Lee (10) Patent No.: US 7,483,279 B2
(45) Date of Patent: Jan. 27, 2009

(54) APPARATUS AND METHOD FOR DETECTING PHASE CURRENTS OF INVERTER

(75) Inventor: Kyung Joo Lee, Gyeonggi-do (KR)

(73) Assignee: LS Industrial Systems Co., Ltd., Seoul (KR)

( * ) Notice: Subject to any disclaimer, the term of this patent is extended or adjusted under 35 U.S.C. 154(b) by 275 days.

(21) Appl. No.: 11/550,087

(22) Filed: Oct. 17, 2006

(65) Prior Publication Data

US 2007/0152676 A1 Jul. 5, 2007

(30) Foreign Application Priority Data

Dec. 30, 2005 (KR) .................... 10-2005-0136041

(51) Int. Cl.
*H02M 1/12* (2006.01)
*H02M 3/24* (2006.01)

(52) U.S. Cl. .......................... 363/41; 363/98
(58) Field of Classification Search .................... 363/41, 363/137, 98
See application file for complete search history.

(56) References Cited

U.S. PATENT DOCUMENTS 7,042,741 B2 * 5/2006 Tanaka et al. .................. 363/41

2006/0255762 A1 11/2006 Yun

OTHER PUBLICATIONS

U.S. Appl. No. 11/550,458 to Park, which was filed on Oct. 18, 2006.

* cited by examiner

*Primary Examiner*—Shawn Riley
(74) *Attorney, Agent, or Firm*—Greenblum & Bernstein, P.L.C.

(57) ABSTRACT

The present invention previously sets a threshold voltage, compares the set threshold voltage with a reference voltage, and judges whether a minimal pulse width of a PWM signal is obtained. When a pulse width of one PWM signal is equal to or greater than the minimal pulse width, but each pulse width of two PWM signals is less than the minimal pulse width, a sine wave voltage corresponding to one of the two PWM signals less than the minimal pulse width is varied to a threshold voltage to detect two phase currents, and a remaining one phase current is calculated based on the two detected phase currents. After the phase current was detected by varying the threshold voltage, a level difference between an original sine wave voltage and the threshold voltage is set as a compensation voltage, and the sine wave voltage is compensated by the compensation voltage.

13 Claims, 4 Drawing Sheets

APPARATUS AND METHOD FOR DETECTING PHASE CURRENTS OF INVERTER

CLAIM FOR PRIORITY

This application is based on and claims priority to Korean Patent Application No. 10-2005-00136041 filed on Dec. 30, 2005 in the Korean Intellectual Property Office (KIPO), the entire contents of which are hereby incorporated by reference.

BACKGROUND OF THE INVENTION

1. Field of the Invention

The present invention relates to an apparatus and a method for detecting phase currents of an inverter, and more particularly, to an apparatus and a method for detecting phase currents of an inverter, which detect three-phase currents of an alternating current (hereinafter referred to as 'AC') power that an inverter outputs to a load.

2. Description of the Related Art

In general, an inverter has been widely used in order to control a load such as an induction motor with precision. The inverter generates a pulse width modulation (referred to as 'PWM' hereinafter) signal, and selectively switches a plurality of switching elements by the generated PWM signal. According to switching of the switching elements, a direct current (referred to as 'DC') power is converted to an AC power, and the converted AC power is supplied to a load, thereby driving it. An Insulated Gate Bipolar Transistor (IGBT) has been widely employed as an example of the switching elements.

As a pulse width of the PWM signal varies, switching times of the plurality of switching elements, a voltage and a frequency of the AC power supplied to the load change to thereby control a toque and a rotating speed of the load with precision.

Further, in response to a command signal of the load, a sine wave voltage having a predetermined frequency is generated as a threshold voltage, and a triangular wave having a predetermined time period is generated. The generated triangular wave is compared with the generated sine wave in level, and a PWM signal is generated according to the comparison result. A time period of the PWM signal is identical with that of the triangular wave. A pulse width of the PWM signal varies according to a difference between a voltage level of the triangular wave and a voltage level of the sine wave.

When such an inverter supplies an over current to the load, the load is damaged, and components constituting the inverter are also broken due to the over current. Accordingly, the inverter detects three-phase currents supplied to the load, and judges whether or not an over current is supplied to the load based on the detected three-phase currents. When it is judged that the over current is supplied to the load, an operation of the inverter stops to prevent the load and the inverter from being damaged due to the over current.

There are known four methods to detect three-phase currents that the inverter supplies to the load. A first method is a method of inserting a plurality of current sensors such as a current transformer between an output terminal of an inverter and a load. A second method is a method of inserting a plurality of current detecting resistors between an output terminal of an inverter and a load. A third method is a method of inserting one current detecting resistor between a negative terminal of a power converter for supplying a DC power and a ground of a switch section. A fourth method is a method of inserting respective current detecting resistors between a plurality of lower switching elements switching a flow of an electric current from a load to a ground and the ground, respectively.

The first method has a disadvantage that the sensors themselves are manufactured at very high cost.

In the second method, a difference of a voltage that a switch section of the inverter supplies to the load and a voltage of a controller of controlling an operation of the inverter is great. For this reason, it requires insulation means to insulate a control circuit from the switch section. The insulation means is expensive and a circuit is complex in construction.

The third method has an advantage that a circuit is simple in construction. However, in order to calculate all the three-phase currents, one current detecting resistor should frequently correct a voltage of a sine wave, which leads to a significantly complicate control.

The fourth method can detect an electric current by a single control. According to the fourth method, so as to detect three-phase currents that the inverter outputs to the load, it must be able to detect at least two phase currents.

That is, the three-phase currents supplied from the inverter to the load are expressed by an equation (1).

$$I_A + I_B + I_C = 0 \qquad (1)$$

Where, $I_A$, $I_B$, and $I_C$ are A-phase, B-phase, and C-phase currents.

As illustrated in equation, because a sum of the three-phase currents is zero ampere, at least two of the three-phase currents are detected, and a remaining one phase current can be calculated based on the two detected phase currents.

So as to detect the three-phase currents supplied from the inverter to the load, a current loop should be constructed to include a plurality of current detecting resistors. In order to measure voltages across the plurality of current detecting resistors in the current loop, a minimal pulse width of the PWM signal is required to flow the phase currents to respective current detecting resistors. A minimal time required to flow a phase current to the respective current detecting resistors depends on the minimal pulse width of the PWM signal. Accordingly, when the minimal time required to detect phase currents in the current loop is insufficient, the phase currents supplied to the load cannot be detected.

While the phase currents are not detected, when an over current from the inverter is supplied to the load, the over current cannot be detected, and components constituting the inverter and the load are damaged due to the over current.

Accordingly, even when each pulse width of two PWM signals is narrower than a minimal pulse width, a detection of the three-phase currents supplied to the load is required.

SUMMARY OF THE INVENTION

Accordingly, it is an object of the present invention to provide an apparatus and a method for detecting phase currents of an inverter, which may obtain a minimal pulse width of a PWM signal by varying a level of a reference voltage, and exactly detect three-phase currents supplied to a load.

Another object of the present invention is to provide an apparatus and a method for detecting phase currents of an inverter, which compensate for a varied level of a reference voltage without influence on a drive of a load in order to obtain a minimal pulse width of a PWM signal.

According to the present invention having the aforementioned objects, a threshold voltage capable of obtaining a minimal pulse width of a PWM signal is previously set. The set threshold voltage is compared with three-phase sine wave voltages being a reference voltage, and it is judged whether a minimal pulse width of a PWM signal capable of detecting three-phase currents can be obtained.

As a result of the judgment, if each pulse width of three PWM signals is equal to or greater than a minimal pulse width, voltages across current detecting resistors are detected as three-phase currents. As a result of the judgment, if each pulse width of two PWM signals is equal to or greater than a minimal pulse width, voltages across the current detecting resistors having phases corresponding to the PWM signals equal to or greater than the minimal pulse width are detected as two phase currents, and a remaining one phase current is calculated based on the two detected phase currents.

As a result of the judgment, if a pulse width of one PWM signal is equal to or greater than the minimal pulse width, but each pulse width of two PWM signals is less than the minimal pulse width, a sine wave voltage corresponding to one of the two PWM signals less than the minimal pulse width is varied to a threshold voltage to detect two phase currents, and a remaining one phase current is calculated based on the two detected phase currents.

Further, in order to detect the three-phase currents, according to a variation of the sine wave voltage, three-phase powers supplied to a load may be varied to cause errors in a drive of the load.

Accordingly, it is preferred that the sine wave voltage varied to the threshold voltage be a signal having the least level difference with the threshold voltage among two PWM signals having a pulse width less than the minimal pulse width, namely, a signal having an intermediate level among three sine wave voltages.

Further, after the phase current was detected by varying the threshold voltage, a level difference between an original sine wave voltage and the threshold voltage is set as a compensation voltage, and the sine wave voltage is compensated by the compensation voltage that allows the load to normally drive.

The above object of the present invention is substantially realized by providing an apparatus for detecting phase currents of an inverter comprising: a switch section for converting a direct current power into an alternating current power and providing the alternating current power to a load as a plurality of upper switching elements and lower switching elements are turned-on according to a plurality of pulse width modulation signals; a plurality of current detecting resistors coupled between the plurality of lower switching elements and a ground, respectively; a plurality of analog/digital converters for converting voltages of the plurality of current detecting resistors into digital signals; a triangular wave generator for generating a triangular wave having a predetermined time period; a current detection controller for generating three-phase sine wave voltages, for comparing the generated three-phase sine wave voltage with a reference threshold voltage, and for varying the three-phase sine wave voltage according to the compared result to control a detection of the phase currents; a pulse width modulation signal generator for comparing the three-phase sine wave voltages from the current detection controller with a voltage of the triangular wave generated by the triangular wave generator to generate and output the plurality of pulse width modulation signals to the switch section; and a phase current detector for detecting output signals of the plurality of analog/digital converters as the phase currents according to a control of the current detection controller.

In accordance with another aspect of the present invention, there is provided a method for detecting phase currents of an inverter, comprising the steps of: (i) generating three-phase sine wave voltages in response to a command signal; (ii) comparing the three-phase sine wave voltages with a reference threshold voltage, respectively; (iii) varying one of two three-phase sine wave voltages among the three-phase sine wave voltages being greater than the threshold voltage into the threshold voltage when one of the three-phase sine wave voltages is equal to or less than the threshold voltage as the comparison result; and (iv) detecting a current of a phase corresponding to the sine wave voltage varied to the threshold voltage and a current of a phase corresponding to a sine wave voltage being less than or equal to the threshold voltage, and calculating a remaining one phase current based on the two detected phase currents.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

An apparatus and a method for detecting phase currents of an inverter according to a preferable embodiment of the present invention will now be described with reference to the accompanying drawings, in which preferred embodiments of the invention are shown. The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements.

Figure 1:
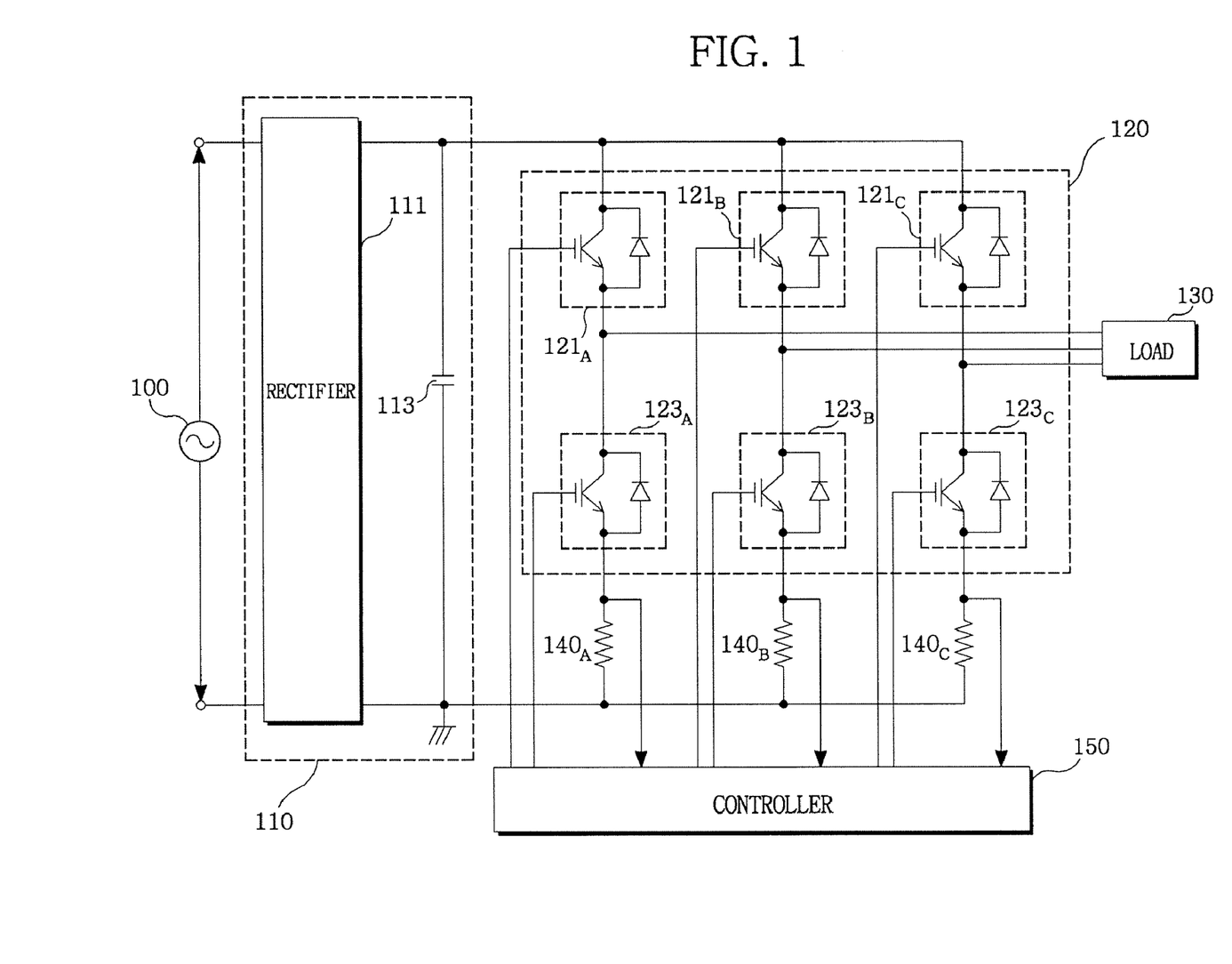
FIG. 1 is a block diagram showing an inverter according to an embodiment of the present invention.

FIG. 1 is a block diagram showing an inverter according to an embodiment of the present invention. Reference numeral 100 represents an alternating current power source. Reference numeral 110 represents a power converter an AC power supplied from the AC power source 100 into a direct current power. The power converter 110 includes a rectifier 111 and a capacitor. The AC power supplied from the AC power source 100 is inputted to the rectifier 111. There is a bridge diode as an example of the rectifier 111. The rectifier 111 rectifies the AC power from the AC power source 100 to obtain a ripple power. The capacitor 113 smoothes the ripple power from the rectifier 111 to obtain a DC power.

Reference numeral 120 notes a switch section for switching and converting the DC power from the power converter 110 into an AC power. Reference numeral 130 is a load, which is driven by the AC power from the switch section 120. For example, the load 130 is a three-phase induction motor. The switch section 120 includes a plurality of upper switching elements $121_A$, $121_B$, $121_C$, and a plurality of lower switching elements $123_A$, $123_B$, $123_C$. The plurality of upper switching elements $121_A$, $121_B$, $121_C$ are switched to supply currents of phases A, B, and C from a positive terminal of the power converter 110 to the load 130 according to a PWM signal. The plurality of lower switching elements $123_A$, $123_B$, $123_C$ are switched to supply currents of phases A, B, and C from the load 130 to a negative terminal of the power converter 110 according to a PWM signal.

Reference numerals $140_A$, $140_B$, and $140_C$ note a plurality of current detecting resistors. The plurality of current detecting resistors $140_A$, $140_B$, and $140_C$ are provided between the plurality of lower switching elements $123_A$, $123_B$, $123_C$ and a ground, respectively. When the plurality of lower switching elements $123_A$, $123_B$, $123_C$ are turned-on, the currents of the phases A, B, and C from the load 130 flow into a negative terminal of the power converter 110 through the plurality of lower switching elements $123_A$, $123_B$, $123_C$ and the plurality of current detecting resistors $140_A$, $140_B$, and $140_C$ to generate a voltage drop in the current detecting resistors $140_A$, $140_B$, and $140_C$.

Reference numeral 150 notes a controller. The controller 150 generates a PWM signal of the present invention. The controller 150 detects voltages across the plurality of current detecting resistors $140_A$, $140_B$, and $140_C$ as the currents of the phases A, B, and C, respectively.

Figure 2:
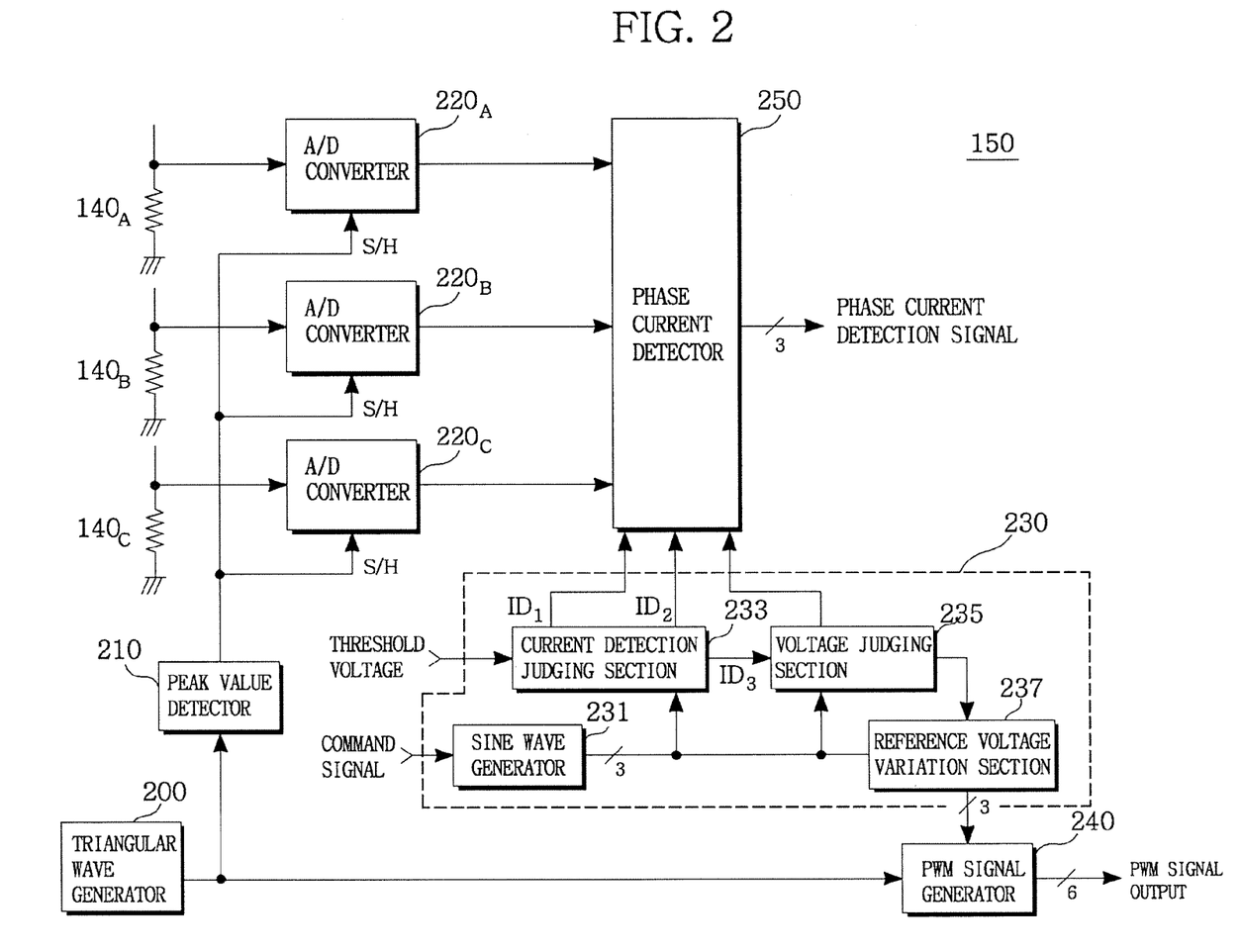
FIG. 2 is a block diagram showing a detailed construction of a controller illustrated in FIG. 1.

FIG. 2 is a block diagram showing a detailed construction of a controller 150 illustrated in FIG. 1. Here, reference numeral 200 notes a triangular wave generator. The triangular wave generator 200 generates a triangular wave having a predetermined period, which has been previously set.

Reference numeral 210 notes a peak value detector. The peak value detector 210 detects a voltage level of the triangular wave from the triangular wave generator 200. When the voltage level of the triangular wave has a peak value, the peak value detector 210 generates a peak value detecting signal.

Reference numerals $220_A$, $220_B$, and $220_C$ represent analog/digital converters. When the peak value detector 210 detects a peak value to generate the peak value detecting signal, the analog/digital converters $220_A$, $220_B$, and $220_C$ sample and hold voltages of the current detecting resistors $140_A$, $140_B$, and $140_C$, and convert them into digital signals.

Reference numeral 230 represents a current detection controller. The current detection controller 230 includes a sine wave generator 231, a current detection judging section 233, a voltage judging section 235, and a reference voltage variation section 237. The sine wave generator 231 generates a sine wave having a predetermined frequency as a reference voltage for driving the load 130 according to a command signal. For example, the load 130 is a three-phase induction motor. The sine wave generator 130 generates three-phase sine wave voltages to drive the load 130 by a three-phase power as a reference voltage.

The current detection judging section 233 compares the three-phase sine wave voltages generated by the sine wave generator 231 with a reference threshold voltage, and selectively generates first to third current detection judging signals $ID_1$, $ID_2$, and $ID_3$ according to the compared result.

When the current detection judging section 233 generates the third current detection judging signal $ID_3$, the voltage judging section 235 judges a sine wave voltage equal to or less than the threshold voltage and a sine wave voltage having an intermediate level among the three-phase sine wave voltages generated by the sine wave generator 231. The voltage judging section 235 also generates a reference voltage variable signal and a voltage detection signal according to the two judged sine wave voltages.

The reference voltage variation section 237 varies a level of one of the three-phase sine wave voltages generated by the sine wave generator 231 to a threshold voltage according to the reference voltage variable signal from the voltage judging section 235.

Reference numeral 240 notes a PWM signal generator 240. The PWM signal generator 240 compares three-phase sine wave voltages from the reference voltage variation section 237 with a voltage of the triangular wave generated by the triangular wave generator 200. The PWM signal generator 240 also generates a plurality of PWM signals according to the compared result, and outputs the plurality of PWM signals to the plurality of upper switching elements $121_A$, $121_B$, $121_C$, and the plurality of lower switching elements $123_A$, $123_B$, $123_C$ of the switch section 120.

Reference numeral 250 notes a phase current detector. When the current detection judging section 233 generates a first current detection judging signal $ID_1$, the phase current detector 250 calculates respective phase currents based on outputs of the analog/digital converters $220_A$, $220_B$, and $220_C$. When the current detection judging section 233 generates a second current detection judging signal $ID_2$, the phase current detector 250 calculates two phase currents based on two of outputs of the analog/digital converters $220_A$, $220_B$, and $220_C$ according to the second current detection judging signal $ID_2$, and calculates a remaining one phase current based on the two calculated phase currents. When the voltage judging section 235 generates a voltage detection signal, the phase current detector 250 calculates two phase currents based on two of output signals of the analog/digital converters $220_A$, $220_B$, and $220_C$ according to the voltage detection signal, and calculates a remaining one phase current based on the two calculated phase currents.

In the apparatus for detecting phase currents of an inverter of the present invention having the construction described above, in order to drive the load 130, the triangular wave generator 200 generates a triangular wave having a predetermined time period, and provides the generated triangular wave to the peak value detector 210 and the PWM signal generator 240.

The peak value detector 210 detects a voltage level of the triangular wave generated by the triangular wave generator 200. When the detected voltage level of the triangular wave is a peak value, the peak value detector 210 provides a peak value detection signal to respective sampling/holding terminals S/H of the analog/digital converters $220_A$, $220_B$, and $220_C$.

Then, the analog/digital converters $220_A$, $220_B$, and $220_C$ sample, hold, and convert voltages of the current detecting resistors $140_A$, $140_B$, and $140_C$ into digital signals, and output the digital signals to the phase current detector 250.

That is, when a voltage of the triangular wave generated by the triangular wave generator 200 has the peak value, the analog/digital converters $220_A$, $220_B$, and $220_C$ convert voltages of the current detecting resistors $140_A$, $140_B$, and $140_C$ into digital signals, and output the digital signals to the phase current detector 250.

Further, when a predetermined external command signal is inputted to the controller 230, the sine wave generator 231 of the controller 230 generates three-phase sine wave voltages having a predetermined frequency as a reference voltage. The three-phase sine wave voltages generated by the sine wave generator 231 are provided to a current detection judging section 233, a voltage judging section 235, and a reference voltage variation section 237.

Moreover, a threshold voltage of a previously set level is inputted to the current detection judging section 233 from an exterior. Here, the threshold voltage is previously set as a level capable of obtaining a minimal time necessary to detect a phase current to be supplied to the load 130. Namely, the threshold voltage functions to determine a time corresponding to an on interval of the PWM signal generated by the PWM signal generator 240, which is a minimal time necessary to detect the phase current. The minimal time indicates a time required in which the phase currents may flow to the current detecting resistors 140$_A$, 140$_B$, and 140$_C$ as the plurality of lower switching elements 123$_A$, 123$_B$, 123$_C$ are switched.

The current detection judging section 233 compares the three-phase sine wave voltages from the sine wave generator 231 with the threshold voltage, respectively. When the three-phase sine wave voltages are all less than or equal to the threshold voltage, the current detection judging section 233 generates and provides the first current detection judging signal ID$_1$ to the phase current detector 250.

Accordingly, the reference voltage variation section 237 outputs a reference voltage being the three-phase current voltages generated by the sine wave generator 231 to the PWM signal generator 240 without varying the reference voltage. The PWM signal generator 240 compares the three-phase sine wave voltages with a voltage of the triangular wave generated by the triangular wave generator 200 to generate a PWM signal. According to the generated PWM signal, the upper switching elements 121$_A$, 121$_B$, 121$_C$, and the lower switching elements 123$_A$, 123$_B$, 123$_C$ are selectively turned-on to supply a three-phase AC power to the load 130, so that the load 130 operates and a phase current flows into the current detecting resistors 140$_A$, 140$_B$, and 140$_C$.

And, the phase current detector 250 detects output signals of the analog/digital converters 220$_A$, 220$_B$, and 220$_C$ as respective phase currents according to the first current detection judging signal ID$_1$.

That is, voltage drops according to the respective phase current are generated in the current detecting resistors 140$_A$, 140$_B$, and 140$_C$. The analog/digital converters 220$_A$, 220$_B$, and 220$_C$ convert levels of the voltage drops into digital signals, and provide the digital signals to the phase current detector 250. The phase current detector 250 detects output signals of the analog/digital converters 220$_A$, 220$_B$, and 220$_C$ as respective phase currents.

As the comparison result, among three-sine wave voltages, when two sine wave voltages are less than or equal to the threshold voltage and a remaining one sine wave voltage is greater than the threshold voltage, the current detection judging section 233 generates and provides the second current detection judging signal ID$_2$ to the phase current detector 250. The second current detection judging signal ID$_2$ includes a signal informing two sine wave voltages being less than or equal to the threshold voltage.

Accordingly, the reference voltage variation section 237 outputs a reference voltage being the three-phase current voltages generated by the sine wave generator 231 to the PWM signal generator 240 without varying the reference voltage. The PWM signal generator 240 compares the three-phase sine wave voltages with a voltage of the triangular wave generated by the triangular wave generator 200 to generate a PWM signal. According to the generated PWM signal, the upper switching elements 121$_A$, 121$_B$, 121$_C$, and the lower switching elements 123$_A$, 123$_B$, 123$_C$ are selectively turned-on to supply an AC power to the load 130, so that the load 130 operates and a phase current flows into the current detecting resistors 140$_A$, 140$_B$, and 140$_C$.

Accordingly, the phase current detector 250 detects two of the output signals of the analog/digital converters 220$_A$, 220$_B$, and 220$_C$ as two phase currents according to the second current detection judging signal ID$_2$, and calculates a remaining one phase current using a first equation 1 based on the two detected phase currents.

For example, assuming that the A-phase and B-phase sine wave voltages are less than or equal to the threshold voltage, and a C-phase sine wave voltage is greater than the threshold voltage among the A-phase, B-phase, and C-phase sine wave voltages generated by the sine wave generator 231, the phase current detector 250 detects output signals of the analog/digital converters 220$_A$ and 220$_B$ as currents of phases A and B according to the second current detection judging signal ID$_2$.

As the comparison result, among three-phase sine wave voltages, when one sine wave voltage is less than or equal to the threshold voltage, but remaining two sine wave voltages are greater than the threshold voltage, the current detection judging section 233 generates and provides the third current detection judging signal ID$_3$ to the voltage judging section 235.

The voltage judging section 235 compares voltage levels of the three-phase sine waves generated by the sine wave generator 231 with each other, and judges a sine wave voltage having the lowest voltage level and a sine wave voltage having an intermediate voltage level based on the comparison result. The voltage judging section 235 generates and outputs a current detecting signal informing a detection of phase currents based on the two judged sine wave voltages to the phase current detector 250. Further, the voltage judging section 235 generates and outputs a reference voltage variable signal informing a variation of the sine wave voltage having an intermediate voltage level to the reference voltage variation section 237.

The reference voltage variation section 237 varies a voltage level of the sine wave voltage having an intermediate voltage level among three-phase sine wave voltages generated by the sine wave generator 231 into a level of a threshold voltage capable of detecting the phase current according to the reference voltage variable signal from the voltage judging section 235, and outputs the varied voltage level of the sine wave voltage to the PWM signal generator 240. Moreover, the reference voltage variation section 237 outputs sine wave voltages having the highest and lowest levels to the PWM signal generator 240 without varying them.

Then, the PWM signal generator 240 compares the two sine wave voltages the levels of which have not been varied and the one sine wave voltage the level of which has varied with a voltage of the sine wave generated by the sine wave generator 200, respectively, to generate a PWM signal. When the PWM signal is inputted to gates of the upper switching elements 121$_A$, 121$_B$, 121$_C$, and the lower switching elements 123$_A$, 123$_B$, 123$_C$ to selectively turn-on them. As the upper switching elements 121$_A$, 121$_B$, 121$_C$, and the lower switching elements 123$_A$, 123$_B$, 123$_C$ are selectively turned-on to supply an AC power to the load 130, with the result that the load 130 operates and a phase current flows into the current detecting resistors 140$_A$, 140$_B$, and 140$_C$.

The phase current detector 250 detects corresponding two of the output signals of the analog/digital converters 220$_A$, 220$_B$, and 220$_C$ as two phase currents according to the current detecting signal from the voltage judging section 235, and calculates and outputs a remaining one phase current based on the two detected phase currents.

As is seen from the forgoing description, after a level of one sine wave voltage is varied to detect phase currents, the reference voltage judging section 237 compensates for a corresponding sine wave voltage varied to the threshold voltage, thereby causing the load to continuously drive at normal speed.

Figure 3:
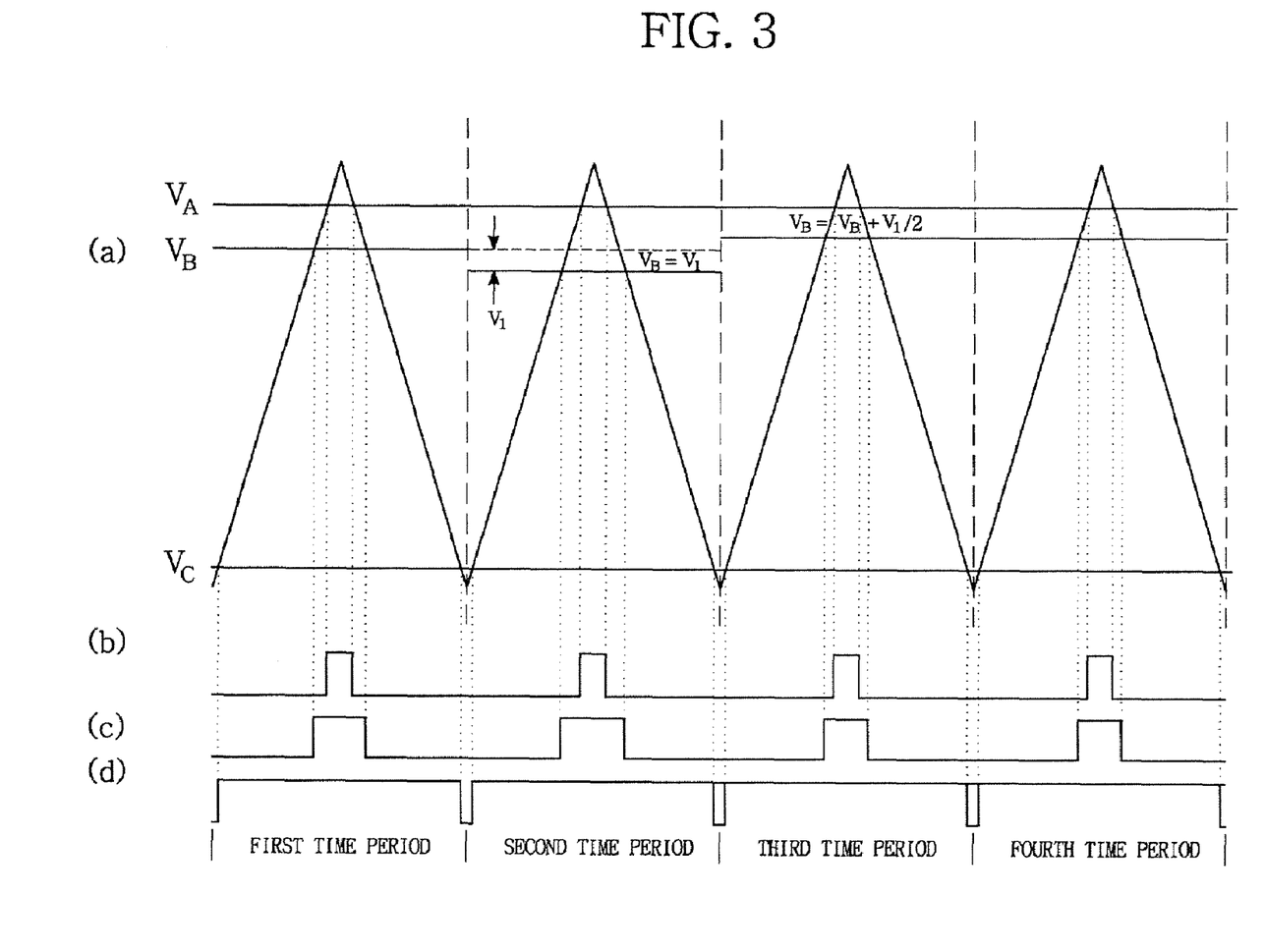
FIG. 3 is a waveform diagram that illustrates an operation of varying and compensating a reference voltage according to an embodiment of the present invention.

An operation of varying the sine wave voltage into the threshold voltage and compensating for the sine wave voltage will be described with reference to FIG. 3. FIG. 3 is a waveform diagram that illustrates an operation of varying and compensating a reference voltage according to an embodiment of the present invention.

In FIG. 3a, a sine wave is generated by a sine wave generator 200. Reference numerals $V_A$, $V_B$, and $V_C$ represent sine wave voltages of phases A, B, and C generated by the sine wave generator 231 as a reference voltage, respectively. VT notes a threshold voltage.

When both sine wave voltages $V_A$ and $V_B$ of phases A and B are greater than the threshold voltage VT, and a sine wave voltage $V_C$ of phase C is less than or equal to the threshold voltage VT during a first time period of a triangular wave voltage, the PWM signal generator 240 generates and provides a PWM signal to gates of the lower switching elements $123_A$, $123_B$, and $123_C$, as shown in FIG. 3b to FIG. 3d. Accordingly, since turning-on time of the lower switching element $123_C$ is long, the phase current detector 250 may sufficiently detect a current of phase C based on a voltage of the current detecting resistor $140_C$. In contrast to this, because turning-on time of the lower switching elements $123_B$ and $123_C$ is shorter than a minimal time capable of the phase current, the phase current detector 150 cannot detect currents of phases A and B.

In this case, the voltage judging section 235 generates and outputs a reference voltage variable signal to the reference voltage variation section 237. Here, the reference voltage variable signal functions to vary a sine wave voltage $V_B$ of a phase B into the threshold voltage VT.

During a second time period of the sine wave voltage, the reference voltage variation section 237 outputs the sine wave voltages $V_A$ and $V_C$ of phases A and C generated by the sine wave generator 231 to the PWM signal generator 240 without varying respective levels thereof, respectively. In contrast to this, the reference voltage variation section 237 varies the sine wave voltage $V_B$ of the phase B into the threshold voltage VT and outputs it to the PWM signal generator 240.

In this case, as shown in FIG. 3c, the PWM signal generated by the PWM signal generator 240 and applied to a gate of the lower switching element $123_B$ has a sufficient pulse width to detect the phase currents.

In addition, the voltage judging section 235 generates and outputs a current detection signal for detecting the currents of the phases B and C to the phase current detector 250.

Accordingly, the phase current detector 250 detects output signals of the analog/digital converters $220_B$ and $220_C$ as the currents of the phases B and C during the second time period, and calculates a current of a phase A based on the detected currents of the phases B and C.

As illustrated earlier, a detection of the phase currents is completed, the reference voltage variation section 237 compensates for a sine wave voltage of the phase B. The compensation of the sine wave voltage of the phase B is achieved during third and fourth time periods of the triangular wave voltage. The reference voltage variation section 237 calculates a level difference $V_1$ between an original sine wave voltage $V_B$ of the phase B and the threshold voltage VT. The reference voltage variation section 237 adds $V_1/2$ being a half of the level difference $V_1$ to the original sine wave voltage $V_B$ of the phase B, and outputs the sum to the PWM signal generator 240.

Accordingly, as shown in FIG. 3c, the pulse width of the PWM signal generated by the PWM signal generator 240 and applied to a gate of the lower switching elements $123_B$ is decreased less than an original width. This compensates for an AC power supplied to the load 130, which leads to a drive of the load 130 according to an original command signal.

Figure 4:
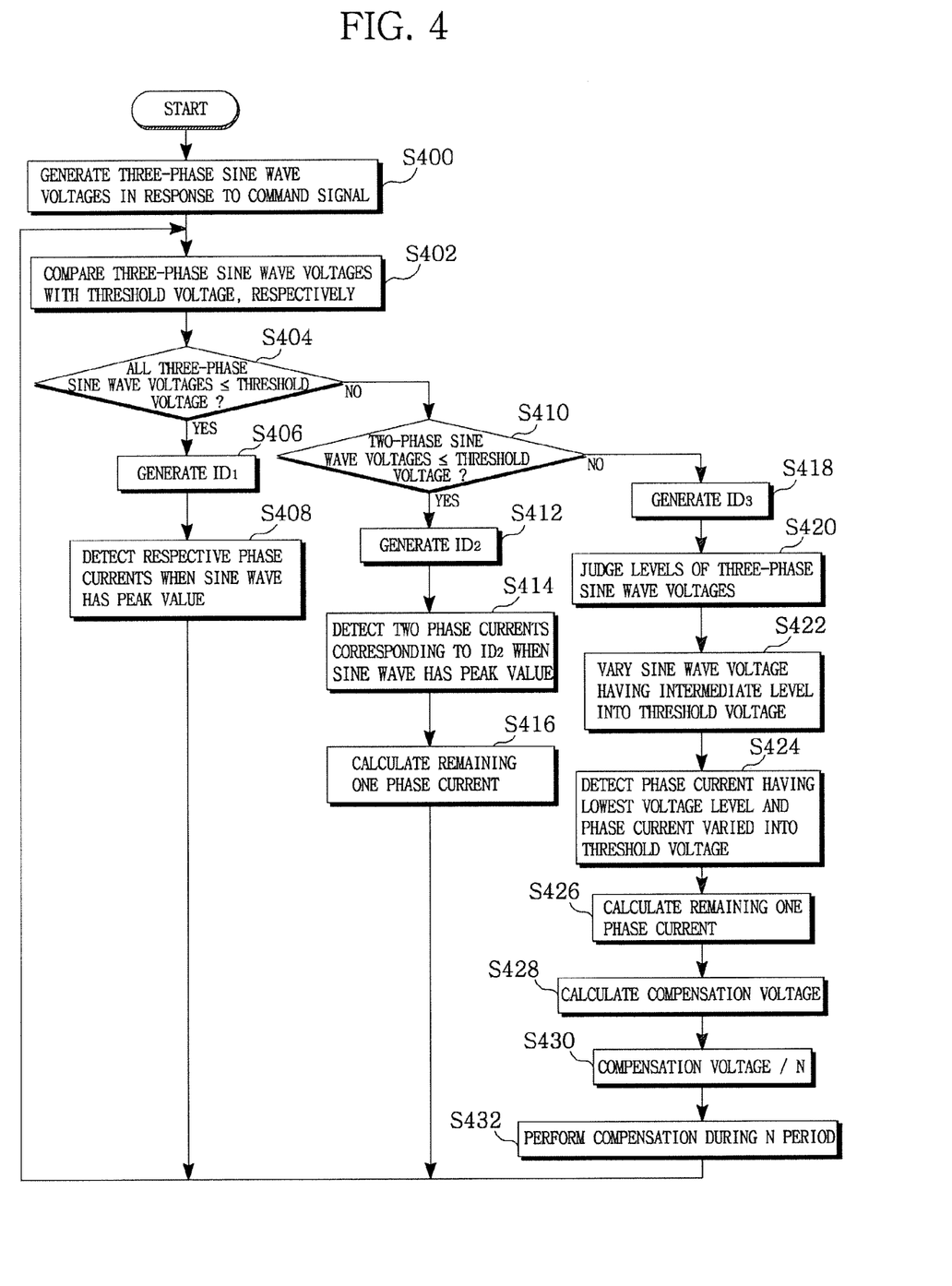
FIG. 4 is a flow chart that illustrates a method for detecting phase currents of an inverter according to an embodiment of the present invention.

FIG. 4 is a flow chart that illustrates a method for detecting phase currents of an inverter according to an embodiment of the present invention. With reference to FIG. 4, in response to a command signal of the load 130, a sine wave generator 231 of the current detection controller 230 generates three-phase sine wave voltages having a predetermined frequency (step S400). The current detection judging section 233 compares the three-phase sine wave voltages with a threshold voltage, respectively, which is previously set (step S402).

As the comparison result, when the three-phase sine wave voltages are all less than or equal to the threshold voltage (step S404), the current detection judging section 233 generates a first current detection judging signal $ID_1$ (step S406). Then, when the sine wave generated by the sine wave generator 200 has a peak value, the phase current detector 250 detects the currents of phases A, B, and C using voltages of the current detecting resistors $140_A$, $140_B$, and $140_C$, which are respectively converted into digital signals by sampling and holding of the analog/digital converters $220_A$, $220_B$, and $220_C$ (step S408).

As the comparison result, when two of the three-phase sine wave voltages are less than or equal to the threshold voltage, and a remaining one-phase sine wave voltage is greater than the threshold voltage (step S410), the current detection judging section 233 generates a second current detection judging signal $ID_2$, which functions to detect two-phase sine wave voltages less than or equal to the threshold voltage as the phase currents (step S412). When the sine wave generated by the sine wave generator 200 has a peak value, the phase current detector 250 detects two output signals of the analog/digital converters corresponding to the second current detection judging signal $ID_2$, among converted digital signals by sampling and holding of the analog/digital converters $220_A$, $220_B$, and $220_C$ as two phase currents (step S414). The phase current detector 250 further calculates a remaining one phase current based on the two detected phase currents (step S416).

On the other hand, as the comparison result, when two of the three-phase sine wave voltages are equal to or greater than the threshold voltage, and a remaining one-phase sine wave voltage is less than the threshold voltage, the current detection judging section 233 generates a third current detection judging signal $ID_3$ (step S418).

Next, the voltage judging section 235 judges levels of the three-phase sine wave voltages generated by the sine wave generator 231 (step S420). According to the judged result, the reference voltage variation section 237 varies a level of the sine wave voltage having an intermediate level into a level of a threshold voltage capable of detecting phase currents (step S422). Further, the voltage judging section 235 generates a current detecting signal to detect a current of a phase having the lowest voltage level among the judged three-phase sine wave voltages and a current of the phase varied into the threshold voltage, and the phase current detector 250 detects a corresponding phase current according to the generated current detecting signal (step S424). Further, the phase current detector 250 calculates a remaining one phase current using the two detected phase currents (step S426).

As described above, when all the phase currents are detected, the reference voltage variation section 237 calculates a compensation voltage (step S428), and divides the calculated compensation voltage by a compensation period N to obtain a divided result value (step S430). The reference voltage variation section 237 performs a compensation operation by adding the divided result value to a sine wave voltage of the phase varied into the threshold voltage during the compensation period N (step S432), thereby causing the load to continuously drive at normal speed.

As mentioned above, where the present invention detects phase currents of an AC power that an inverter outputs to a load, when a pulse width of a PWM signal is not sufficient to detect the phase currents, it adjusts the pulse width of the PWM signal to detect the phase currents. Further, when a detection of the phase currents is determined, a sine wave voltage of a phase having an adjusted pulse width is compensated. Therefore, while the inverter supplies an AC power to the load in order to drive it, the present invention may continuously detect phase currents flowing into the load.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An apparatus for detecting phase currents of an inverter, comprising:
    a switch section for converting a direct current power into an alternating current power and providing the alternating current power to a load as a plurality of upper switching elements and lower switching elements are turned-on according to a plurality of pulse width modulation signals;
    a plurality of current detecting resistors coupled between the plurality of lower switching elements and a ground, respectively;
    a plurality of analog/digital converters for converting voltages of the plurality of current detecting resistors into digital signals;
    a triangular wave generator for generating a triangular wave having a predetermined time period;
    a current detection controller for generating three-phase sine wave voltages, for comparing the generated three-phase sine wave voltage with a reference threshold voltage, and for varying the three-phase sine wave voltage according to the compared result to control a detection of the phase currents;
    a pulse width modulation signal generator for comparing the three-phase sine wave voltages from the current detection controller with a voltage of the triangular wave generated by the triangular wave generator to generate and output the plurality of pulse width modulation signals to the switch section; and
    a phase current detector for detecting output signals of the plurality of analog/digital converters as the phase currents according to a control of the current detection controller.

2. The apparatus as claimed in claim 1, further comprising a peak value detector for detecting and outputting a peak value of the triangular wave generated by the triangular wave generator to sampling/holding terminals of the plurality of analog/digital converters.

3. The apparatus as claimed in claim 1, wherein the current detection controller includes:
    a sine wave generator for generating three-phase sine wave voltages in response to a command signal of the load;
    a current detection judging section for comparing the three-phase sine wave voltages generated by the sine wave generator with the reference threshold voltage, for selectively generating first to third current detection judging signals according the compared result, and for causing the phase current detector to detect the phase currents according to the first and second current detection judging signals;
    a voltage judging section for generating a reference voltage variable signal to vary one of the three-phase sine wave voltages and a current detection signal when the current detection judging section generates the third current detection judging signal, and for causing the phase current detector to detect the phase currents according to the generated current detection signal; and
    a reference voltage variation section for outputting the three-phase sine wave voltages by the sine wave generator to the pulse width modulation signal generator when the current detection judging section does not generate the reference voltage variable signal, and for varying and outputting a level of a corresponding sine wave voltage to the pulse width modulation signal generator when the current detection judging section generates the reference voltage variable signal.

4. The apparatus as claimed in claim 3, wherein the current detection judging section generates the first current detection judging signal when the three-phase sine wave voltages are all less than or equal to the threshold voltage, thereby causing the phase current detector to detect the output signals of the plurality of analog/digital converters as respective three-phase currents.

5. The apparatus as claimed in claim 3, wherein the current detection judging section generates the second current detection judging signal when two of the three-phase sine wave voltages are less than or equal to than the threshold voltage, thereby causing the phase current detector to detect at least one output signal of a phase corresponding to the three-phase sine wave voltages being equal to or less than the threshold voltage among the output signals of the plurality of analog/digital converters as two phase currents, and for calculating a remaining one phase current based the two detected phase currents.

6. The apparatus as claimed in claim 3, wherein the current detection judging section generates the third current detection judging signal when one of the three-phase sine wave voltages is less than or equal to the threshold voltage, thereby causing the voltage judging section to generate the reference voltage variable signal and the current detection signal.

7. The apparatus as claimed in claim 3, wherein the reference voltage variable signal generated by the voltage judging section functions to vary a sine wave voltage of an intermediate level among the three-phase sine wave voltages into the threshold voltage.

8. The apparatus as claimed in claim 3, wherein the reference voltage variation section varies a sine wave voltage of a phase corresponding to the reference voltage variation signal into a threshold voltage and then sets a difference between an original sine wave voltage and the threshold voltage as a compensation voltage, and compensates and outputs the sine wave voltage of the corresponding phase by the set compensation voltage.

9. The apparatus as claimed in claim 8, wherein the compensation voltage is obtained by adding a voltage obtained by dividing the compensation voltage by N (where, N is a natural number) to the sine wave voltage of the corresponding phase during an N time period of the sine wave generated by the sine wave generator.

10. A method for detecting phase currents of an inverter, comprising:
- (i) generating three-phase sine wave voltages in response to a command signal;
- (ii) comparing the three-phase sine wave voltages with a reference threshold voltage, respectively;
- (iii) varying one of two three-phase sine wave voltages among the three-phase sine wave voltages being greater than the threshold voltage into the threshold voltage when one of the three-phase sine wave voltages is equal to or less than the threshold voltage as the comparison result; and
- (iv) detecting a current of a phase corresponding to the sine wave voltage varied to the threshold voltage and a current of a phase corresponding to a sine wave voltage being less than or equal to the threshold voltage, and calculating a remaining one phase current based on the two detected phase currents.

11. The method as claimed in claim 10, further comprising detecting phase currents corresponding to the three-phase sine wave voltages when the three-phase sine wave voltages are all less than or equal to the threshold voltage as the comparison result.

12. The method as claimed in claim 10, further comprising:
- detecting currents of phases corresponding to two sine wave voltages being less than or equal to the threshold voltage when three of the three-phase sine wave voltage are less than or equal to the threshold voltage as the comparison result; and
- calculating a remaining one phase current based on the two detected phase currents.

13. The method as claimed in claim 10, further comprising:
- setting a difference between an original sine wave voltage and the threshold voltage as a compensation voltage after a calculation of the phase currents; and
- adding the set compensation voltage to a corresponding sine wave voltage for compensating for the original sine wave voltage.

* * * * *

UNITED STATES PATENT AND TRADEMARK OFFICE
CERTIFICATE OF CORRECTION

PATENT NO. : 7,483,279 B2  Page 1 of 1
APPLICATION NO. : 11/550087
DATED : January 27, 2009
INVENTOR(S) : K. Lee et al.

It is certified that error appears in the above-identified patent and that said Letters Patent is hereby corrected as shown below:

At column 12, line 5 (claim 3, line 9), insert --to-- before "the compared result".

At column 12, line 35 (claim 5, line 4), delete "than" before "the threshold voltage".

At column 12, line 41 (claim 5, line 10), insert --on-- before "the two detected phase currents".

At column 14, line 7 (claim 12, line 4), "voltage" should be --voltages--.

Signed and Sealed this

Twenty-fourth Day of November, 2009

David J. Kappos
*Director of the United States Patent and Trademark Office*